US007265857B1

(12) United States Patent
Murata

(10) Patent No.: US 7,265,857 B1
(45) Date of Patent: Sep. 4, 2007

(54) MEDIUM WHERE STATUS INFORMATION PRINTING PROGRAM IS RECORDED, PRINTER, PRINT CONTROLLER, STATUS INFORMATION PRINTING METHOD, AND STATUS INFORMATION PRINTING SYSTEM

(75) Inventor: Sunao Murata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 710 days.

(21) Appl. No.: 09/889,567

(22) PCT Filed: Dec. 1, 2000

(86) PCT No.: PCT/JP00/08503

§ 371 (c)(1),
(2), (4) Date: Sep. 20, 2001

(87) PCT Pub. No.: WO01/40927

PCT Pub. Date: Jun. 7, 2001

(30) Foreign Application Priority Data

Dec. 1, 1999 (JP) ................................. 11-341778

(51) Int. Cl.
*G03F 15/00* (2006.01)
(52) U.S. Cl. .................... 358/1.15; 358/1.13; 358/1.14
(58) Field of Classification Search ............... 358/1.15, 358/1.9, 2.1, 1.11, 1.12, 1.13, 1.14, 1.16
See application file for complete search history.

(56) References Cited

U.S. PATENT DOCUMENTS

| | | | | | |
|---|---|---|---|---|---|
| 5,694,618 | A | * | 12/1997 | Hibino ......................... | 710/46 |
| 5,716,148 | A | * | 2/1998 | Tamagaki ..................... | 400/74 |
| 5,727,135 | A | * | 3/1998 | Webb et al. ................. | 358/1.14 |
| 5,800,081 | A | * | 9/1998 | Teradaira et al. ............. | 400/74 |
| 5,850,583 | A | * | 12/1998 | Song et al. ................... | 399/24 |
| 6,392,758 | B2 | * | 5/2002 | Hines .......................... | 358/1.9 |
| 6,667,812 | B1 | * | 12/2003 | Sato et al. ................. | 358/1.15 |
| 6,771,378 | B2 | * | 8/2004 | Akiyama et al. .......... | 358/1.14 |
| 6,977,739 | B2 | * | 12/2005 | Higuchi et al. ............ | 358/1.15 |

FOREIGN PATENT DOCUMENTS

| | | |
|---|---|---|
| JP | 9-179699 | 7/1997 |
| JP | 10-305564 | 11/1998 |
| JP | 11-91202 | 4/1999 |
| JP | 11-198486 | 7/1999 |

* cited by examiner

*Primary Examiner*—Kimberly A. Williams
(74) *Attorney, Agent, or Firm*—Oblon, Spivak, McClelland, Maier & Neustadt, P.C.

(57) ABSTRACT

If the printer generates the printing data itself completely, the processor in the printer generates the printing data after performing the predetermined processing based on the status information data by use of the font ROM, etc. The user enables the printing initiation instruction on the status information to be implemented by the switch on the printer (the printing initiation instruction module and the output initiation instruction monitoring module). With the printing initiation instruction, the printer and the host computer perform the two-way communication through the parallel communication I/O interfaces. Through the communication, the status information output module once transmits the status information obtained in the status information acquisition module on the printer to the host computer. When the status information acquisition module on the printer obtains the status information on the host computer, the printing data output module generates the printing file, and then the printing data output module implements the printing job for the printing file. Therefore, it is not necessary to equip the processor and the font ROM with the printer to generate the printing data. The status information can be printed on the simple and low-cost printer.

28 Claims, 12 Drawing Sheets

MEDIUM WHERE STATUS INFORMATION PRINTING PROGRAM IS RECORDED, PRINTER, PRINT CONTROLLER, STATUS INFORMATION PRINTING METHOD, AND STATUS INFORMATION PRINTING SYSTEM

TECHNICAL FIELD

The present invention relates to a medium on which is recorded a status information printing program for printing the status information on a printer. The invention also relates to a printer, a printing controller, a status information printing method, and a status information printing system.

BACKGROUND OF THE INVENTION

Field of the Invention

A printer includes a paper feeder, toner, a photo conductor, and various mechanisms. Various settings like the use of color and the printing resolution are necessary for printing. A user of the printer may need to know the status of the mechanisms mentioned above and settings, that is, the status of the printer. The user may want to know if desired settings have been made before printing. It is convenient for the user to know the remaining toner, the photo conductor life, etc.

A conventional printer is fitted with a status printing instruction button and a processor for generating status on printing data. When the instruction button is pushed, the processor causes the printer to gain its own status information data. Then, the printer generates printing images on the basis of the status information data and prints the data.

SUMMARY OF THE INVENTION

To generate the printing data, the processor needs to perform predetermined processing based on the status information data. For example, a page printer makes printing possible by generating predetermined characters with the font ROM in the printer, and by storing the data corresponding to the printing image in the frame memory.

Thus, in order for the printer itself to print the status information, it needs to be equipped in it with a processor for generating the printing data and a font ROM. If a great amount of processing is performed for the status information, the printing time is long. For a higher printing speed, an advanced processor is necessary, causing the cost of the printer to rise.

In view of the above-mentioned problems, an object of this invention is to provide a medium on which is recorded a status information printing program capable of providing a user with desired status information. Another object of the invention is to provide a simple low-cost printer, a printing controller, a status information printing method and a status information printing system, all for use with such a medium.

The invention is a medium having a status information printing program recorded thereon to be run on a host computer in order for a printer to print status information. The host computer and the printer are connected for two-way communication. The medium causes the host computer to realize an output initiation instruction monitor function for monitoring the output initiation instruction for the status information that the printer outputs through the two-way communication, a status information acquisition function on the host side for acquiring status information data from the printer through the two-way communication, a printing data generation function for generating printing data to be printed by the printer based on the status information data acquired by the status information acquisition function on the host side when the output initiation instruction is recognized by the output initiation instruction monitor function, and a printing data output function for outputting to the printer through the two-way communication the printing data generated by the printing data generation function.

In the invention, the printer and the host computer are connected for two-way communication. The status information is printed on the printer by processing the status information printing program run on the host computer. For this reason, with the status information printing program run on the host computer, the output initiation instruction monitor function monitors the output initiation instruction for the status information outputted by the printer through the two-way communication. In the status information acquisition function on the host side, the status information data is acquired from the printer through the two-way communication. When the output initiation instruction monitor function distinguishes the output initiation instruction, the printing data generation function generates the printing data to be printed on the printer based on the status information data acquired by the status information acquisition function on the host side. Then, the printing data generation function outputs the printing data to the printer through the two-way communication.

In other words, the printing data is not generated by the printer itself, but it is generated on the host computer by transmitting the status information data from the printer to the host computer through the two-way communication. Although the printing data for printing the status information is based on the status information data, it is not necessary to distinguish on the host computer whether the printing data is status information or usual data. In short, the printing data is generated on the host computer by the same processing as the usual printing job, and the generated printing data is transmitted to the printer, so that printing can be performed on the basis of the printing data. If this data is status information, the status information can be acquired as the result of the printing. Consequently, the printer requires no hardware for converting the status information data into printing data, and can be simple in structure.

In this way, the invention is embodied by the host computer realizing the output initiation instruction monitor function, the status information acquisition function on the host side, the printing data generation function, and the printing data output function. There are various methods of providing the program and various manners of running it to realize these functions. Since the functions manage printing processing, it is preferable that they be provided as drivers. Part or all of the functions may be realized by one or more applications. Drivers may be originally installed in the operating system of the host computer, and at least one of the functions may be installed so that all the functions can be materialized.

Thus, since the printer does not need to convert the status information data into printing data, it does not need to be equipped with an advanced processor. The printer can be simpler in structure depending on the type of printing data. As an example, the invention is the medium in which the printing data generated by the printing data generation function is dot image data.

In the invention, the printing data generation function generates printing data as dot image data. In other words, if the printing data based on dot image data is used, the printer can print the printing data as inputted into it. Therefore, it is not necessary to equip the printer with a font ROM, neither is it necessary for a processor to perform printing data generation processing based on a page description language. It is consequently possible to make the printer simpler in structure.

In the host computer that executes the program of this invention, there are various methods of monitoring the output initiation instruction. As an example, the invention is the medium in which it constitutes part of the status information data in the printer whether the output initiation instruction exists or not. The output initiation instruction monitor function monitors whether the output initiation instruction is contained in the status information data acquired by the status information acquisition function on the host side.

In the invention, it constitutes part of the status information data in the printer whether the output initiation instruction exists. The status information acquisition function on the host side of the host computer, which runs the program of this invention, has acquired the status information data from the printer. The output initiation instruction monitor function monitors whether the acquired status information data contains the output initiation instruction. Because the host computer has acquired with the status information acquisition function on the host side the status information data including the data as to whether the output initiation instruction exists, the computer can judge if the output initiation instruction exists by monitoring the status information data with the output initiation instruction monitor function. The status information acquisition function on the host side may periodically acquire status information data, or alternatively may acquire the newest data any time there is a change in the status information.

As another example of the structure for monitoring the output initiation instruction in the host computer, which executes the program of this invention, the invention is the medium in which the output initiation instruction is a trigger transmitted from the printer through the two-way communication. The output initiation instruction monitor function judges whether the trigger is received.

In the invention, the output initiation instruction is a trigger transmitted from the printer through the two-way communication. The output initiation instruction monitor function of the host computer, which executes the program of this invention, determines whether the trigger is received through the two-way communication. The printer can output a trigger as an output initiation instruction through the two-way communication. The output initiation instruction monitor function monitors the trigger. When the trigger is received, the printing data generation function may generate the printing data.

The status information data may be generated only when it needs generating so that the status information can be printed. Therefore, if the printer is adapted to output status information data after outputting a trigger, it is possible to reduce the memory capacity for the storage of status information data by outputting in real time the status information data acquired in the printer, or by successively outputting a predetermined amount of status information data after storing it in the memory.

As stated above, the host computer acquires the status information from the printer and outputs the printing data generated in itself. However, if the printer is jammed or fails otherwise, it can perform no printing, so that no status information may be acquired. As an example suitable for such a case, the invention is the medium in which the status information acquisition function on the host side analyzes the status of the printer based on the acquired status information data. If the printer can perform no printing, the status information acquisition function on the host side so warns the user on the host computer.

In the invention, the status information acquisition function on the host side can analyze the contents of the acquired data. In other words, the status information acquisition function on the host side analyzes the status of the printer based on the acquired status information data. If the printer can perform no printing, the host computer so warns the user. Therefore, because the user can judge whether the processing on the host computer is performed, he or she can avoid waiting for a considerable time for the status information to be printed. The user can obtain at least the information that the status of the printer is unprintable.

When the printer is unprintable, it performs no printing even if the printing data is generated by the printing data generation function and outputted by the printing data output function. It is preferable that, when the warning is given, no printing data be generated and outputted, because the processing is just wasteful. Because the warning is given only to let the user know that the printer is unprintable, the fact may only be displayed on the host computer. It is also preferable that, at the same time that the warning is displayed, the user be informed of the acquired status information.

As stated hereinbefore, two-way communication is held between the printer and the host computer to print a status sheet. In order to acquire more accurate status information by taking advantage of two-way communication, the invention is the medium in which the status information acquisition function on the host side acquires the communication mode as the status information data when two-way communication is held with the printer.

In the invention, the status information acquisition function on the host side acquires the real communication mode as the status information data when the two-way communication takes place. Therefore, the printed status sheet precisely reflects the communication mode. A communication mode may not be precisely printed by the conventional printer or the like, which prints a status sheet by using the status information held by itself. The communication mode depends on the relationship between the printer and the host computer. Two-way communication is not necessarily held in the communication mode held by the printer. In this invention, two-way communication is held between the printer and the host computer necessarily when a status sheet is printed, and the actual communication mode is acquired as the status information. Therefore, the status sheet is precisely printed with the good communication mode at all times.

The invention is the medium, in which the printing data generation function generates from a default file the form of the printing images that the printer prints, then generates the character string image corresponding to the status based on the status information data, and generates the printing image by superposing them together.

In the invention, the form of the fixed (typical) images and the character string images that change with the status are individually generated, and then superposed to generate the printing images.

In other words, individual image generation processing is made minimum if only character images are newly generated and the finite form is generated from the default file every time printing takes place.

The recording medium may be a magnetic recording medium or a magneto-optical recording medium. Any recording medium developed from now on may be available. No question is about duplicate stages as a primary and a secondary duplicate product. In addition, when a communication circuit is used to supply this medium, this invention can be available.

As a specific printer that has a simple structure and prints status information, the invention is a printer for holding two-way communication with a host computer and printing status information about itself. This printer comprises an output initiation instruction unit for instructing the output initiation of the status information, a status information acquisition unit on the printer's side for acquiring status information data on the printer, a status information output unit for outputting through the two-way communication the status information data acquired by the status information acquisition unit on the printer's side, and causing the host computer to generate printing data for the printer to print the status information, and a printing unit for receiving the printing data from the host computer through the two-way communication and performing predetermined printing based on the received data.

As stated above, the invention is a printer for holding two-way communication with a host computer and printing status information about itself. The output initiation instruction unit enables a user to instruct the output initiation of the status information. The status information acquisition unit on the printer's side acquires the status information data on the printer. The status information output unit outputs through the two-way communication the status information data acquired by the status information acquisition unit on the printer's side. Consequently, the host computer generates the printing data for the printer to print the status information, and outputs the generated printing data through the two-way communication. The printing unit causes the printer to receive the printing data form the host computer through the two-way communication and perform the predetermined printing based on the received data.

In other words, the printer can output the status information data to the host computer under the directions of the user. The printing unit just performs printing as the original function of the printer. The printing unit need not distinguish the normal printing data and the status information data from each other. If the printing data, which is sent after the output initiation instruction on the status information is given by the output initiation unit, is printed as a normal printing job, the printing result can be recognized as the status information. This saves the necessity to fit the printer with a processor for generating the printing data. Consequently, a printer of low cost can be realized. If the printing data is dot image data, it is not necessary to provide a font ROM, neither is it to necessary to perform printing data generation processing based on a page description language in a processor. As a result, the printer can be simpler.

There are various forms of output initiation instructions on the printer. The printer can cope with a case where the output initiation instruction is part of the status information data, and where the host computer acquires the status information data containing the output initiation instruction. The printer can cope with a case where the output initiation instruction is a trigger output, and where the host computer monitors the trigger. There are various constitutions for users to give the output initiation instruction on the printer. As an example, the invention is the printer in which the output initiation instruction unit includes a predetermined instruction button. Multiple operation of the instruction button gives the output initiation instruction.

In the invention, the printer includes the predetermined instruction button, the multiple operation of which gives the output initiation instruction. In other words, while it is preferable that the hardware mounted in the printer be less to make the printer simple in structure, the instruction button can be easily constituted. The number of instruction buttons can be small if different functions are determined by the number of times they are pushed. Specifically, different functions can be achieved by the instruction buttons being pushed once and twice within a predetermined unit time.

The status information to be printed for confirmation includes the information on the toner that decreases gradually as the printing operation goes on and the information on the mounted memory that will not decrease once the power is turned on. For this reason, the invention is the printer in which the status information acquisition unit on the printer's side acquires fixed status information only when the printer is booted, and this unit acquires sequentially updated status information when the status is updated.

In the invention, the status information is not acquired uniformly. Although the fixed status information is acquired only when the printer is booted, the status information that may be successively updated is acquired every time the status is updated. Thus, the processing burden that acquires the status information is reduced.

When the cost of the printer is intended to be low, the processing capability of the microcomputer etc. mounted in the printer is made small. Therefore, the reduction of processing burdens is necessary to prevent the printing processing primarily expected from being affected.

Even if the present invention consists of software and hardware in the medium on which the status information printing program is recorded and the printer, the idea of the invention makes no difference. Part of the invention may be stored in a record medium and read whenever necessary. The invention is realized in the program itself, and applied to any device containing the program and to the program itself.

Thus, the tangible host computer realizes the method of generating the printing data based on the status information data based on the output from the printer. In this sense, it is understandable that the invention can also be applied as such a tangible apparatus containing a host computer. In other words, the invention is effective also as a tangible apparatus controlled by a host computer. The invention may be realized in the apparatus itself, or in equipment containing the apparatus and with another method. The idea of the invention is not limited to these, but may be modified in various ways whenever necessary.

When processing advances according to the control, the invention substantially exists in the procedure. It is therefore easy to understand that the invention can be applied also as a method. In other words, the invention is not limited necessarily to a tangible medium or the like, but is also effective as a method. The invention is also effective as the status information printing system consisting of the printer and the host computer, which perform the predetermined communication so that the status information can be printed.

BEST MODE FOR CARRYING OUT THE INVENTION

An embodiment of the present invention will be described below with reference to the drawings.

Figure 1:
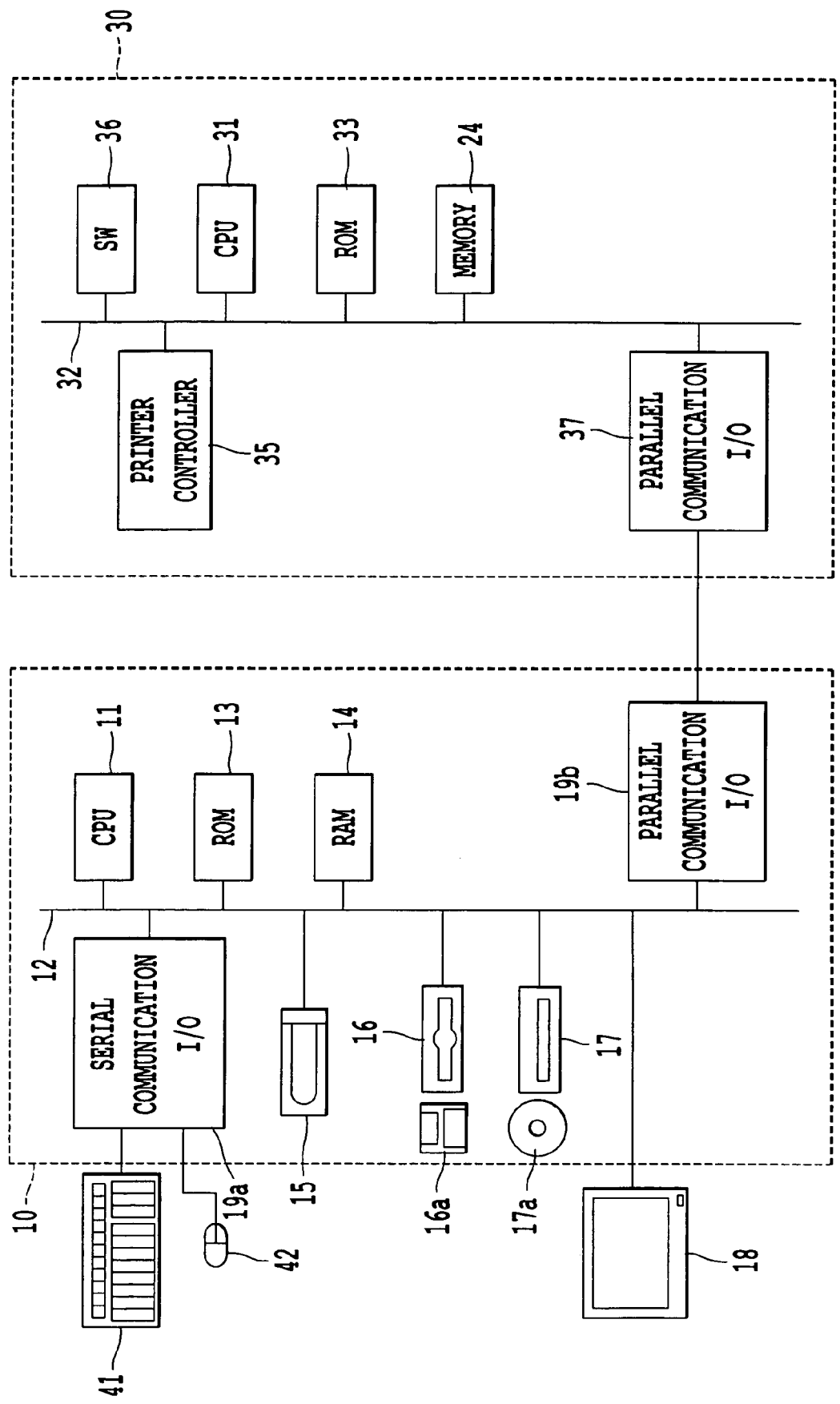
FIG. 1 shows a schematic hardware diagram of a system consisting of a printer for status printing and a host computer.
Figure 2:
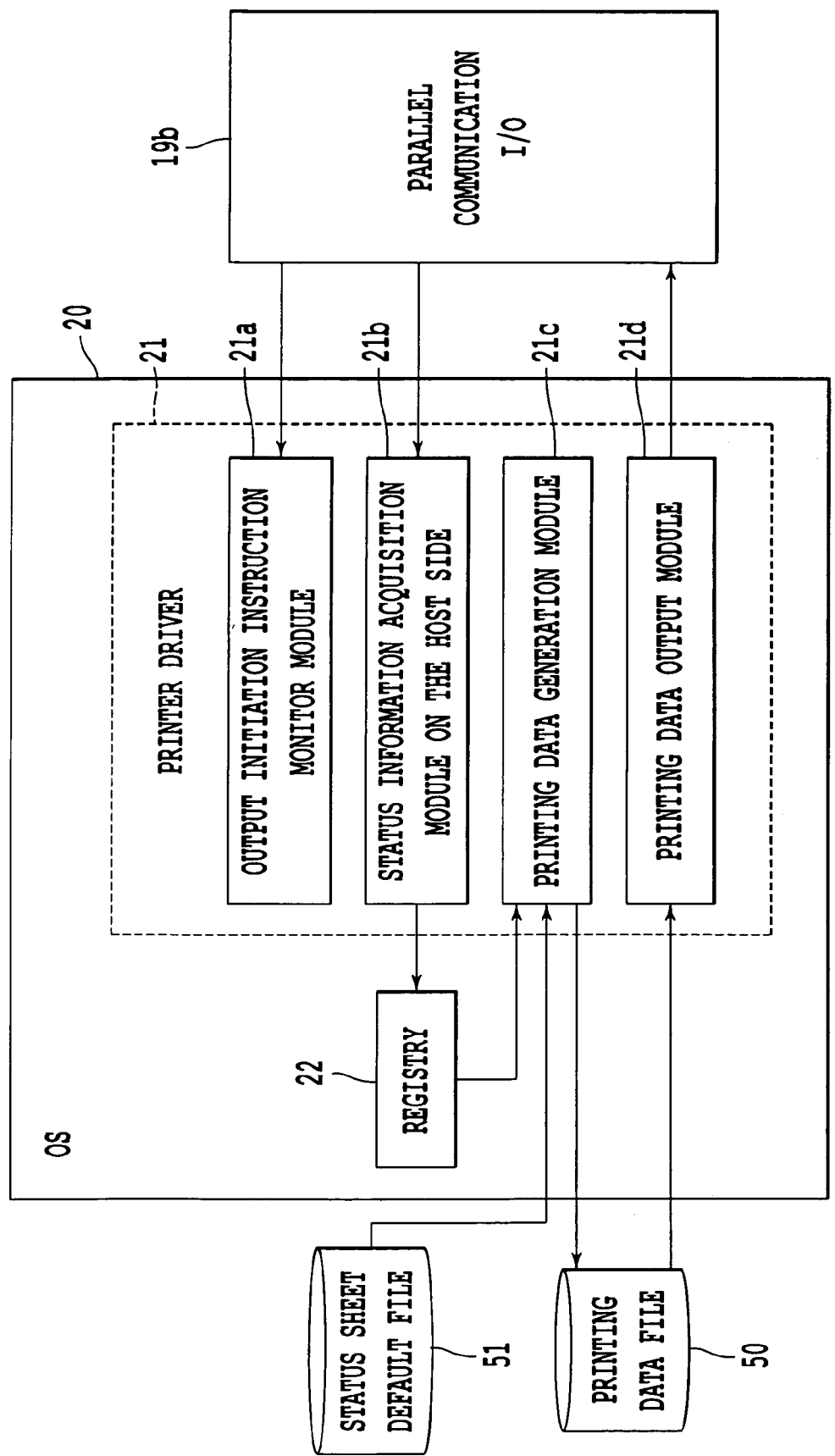
FIG. 2 is a schematic diagram showing the present invention realized as a printer driver.
Figure 3:
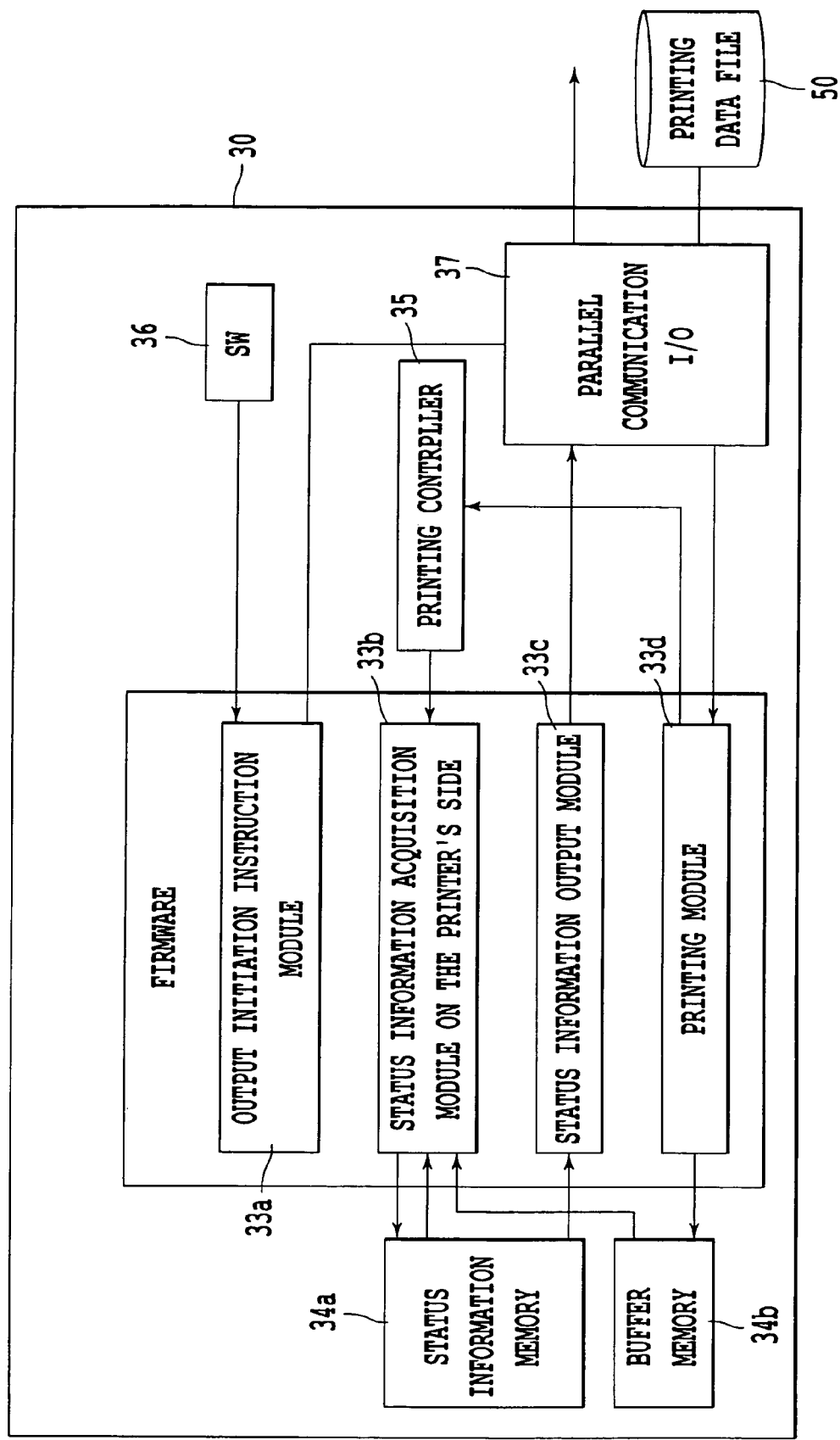
FIG. 3 is a schematic diagram of the main composition of a printer embodying the invention.

FIG. 1 shows a schematic hardware configuration of a system consisting of a printer for status printing and a host computer. FIG. 2 is a schematic diagram showing the invention realized as the printer driver on the operation system on the host computer. FIG. 3 is a schematic diagram of the main composition for printing status information on a printer embodying the invention. In FIGS. 2 and 3, the main components are shown as modules (which correspond to the units as elements of the invention).

First, reference is made to FIG. 1 showing the schematic hardware configuration. A host computer 10 includes a CPU 11 for central operation, which can access a ROM 13 and a RAM 14 through a system bus 12. A BIOS or the like is written on the ROM 13. The system bus 12 is connected to a hard disk drive 15 as an eternal storage, a floppy disk drive 16, and a CD-ROM drive 17. The operation system 20 and applications stored in the hard disk drive 15 are transmitted to the RAM 14. The CPU 11 accesses the ROM 13 and the RAM 14 whenever necessary, and implements the software.

A serial communication I/O interface 19a is connected to devices such as a keyboard 41 and a mouse 42. The serial communication I/O interface 19a is also connected to a display 18 through a video board, which is not shown. The serial communication I/O interface 19a can be connected in parallel to a printer 30 through a parallel communication I/O interface 19b. The host computer 10 is described as simplified in structure, but may be a personal computer that is general in structure.

Of course, the host computer to which this invention is applied is not limited to a personal computer. The host computer 10 is a desktop computer, but might be a notebook type or the type corresponding to a mobile computing device. The interface between the host computer 10 and the printer 30 need not be limited to the parallel communication I/O interface 19b, but various connections might be available including a serial interface, SCSI and USB connections, and any connection, which may be developed in the future.

Programs are stored in the hard disk drive 15, but might alternatively be stored in the floppy disk 16a or the CD-ROM 17a. If the programs were recorded on the floppy disk 16a or the CD-ROM 17a, the host computer 10 would read them through the floppy disk drive 16 or the CD-ROM drive 17, respectively, and install them in the hard disk drive 15. Then, the programs would be read through the hard disk drive 15 into the RAM 14 to control the host computer 10. The record media might include a magneto-optical disc. A nonvolatile memory such as a flash card could be used as a semiconductor device. No doubt, even if an external file server is accessed through a modem or a communication circuit to download a program, the memory unit of the server may serve as a record medium.

The printer 30 includes a CPU 31 for central operation, which can access a ROM 33 and a memory 34 through a system bus 32. The memory 34 consists of a status information memory 34a for storing status information data and a buffer memory 34b for storing printing data. The status information memory 34a may be a RAM or an EEPROM. The system bus 32 is connected to a printer controller 35 for controlling the printing drive mechanisms of the printer 30, a switch (SW) 36 for instructing the output initiation of status information, and a parallel communication I/O interface 37. The CPU 31 accesses the ROM 33 and the memory 34 when necessary, executing the predetermined firmware.

The CPU 31 controls the print controller 35 based on the printing data stored in the RAM 33, printing various kinds of printing including the status information data. The CPU 31 acquires the status information data on the printer 30. If the switch 36 is pushed, the CPU communicates with the host computer 10 through the parallel communication I/O interface 37 and outputs the status information data. For printing, only simple firmware is stored in the ROM 33. Since the printer 30 receives the status information as a printing data file based on image data, as stated later on, it is not necessary to generate printing images from the contents of a page description language. Neither is it necessary to store font data in the ROM. The CPU 31 is required to perform simple processing. This makes it possible to reduce the cost of the printer 30.

The firmware in the printer 30 consists of modules as shown in FIG. 3. When the printer 30 is booted, a status information acquisition module 33b on the printer's side accesses the printer controller 35 and the memory 34 through the system bus 32, and then acquires the status information data on the "optional paper feeder currently used" and the "mounted memory size", which obviously corresponds to the fixed status data. The status information acquisition module 33b also accesses the printer controller 35 through the system bus 32 and acquires, every time the system is updated, the status information data on the "toner remaining", the "life of consumable supplies such as the photo conductor", the "total number of sheets printed", the "type of paper mounted", and "whether printing can be performed or not". The status information data thus acquired by the status information acquisition module 33b on the printer's side is stored in the status information memory 34a. The status information to be acquired is not limited to the foregoing, but might additionally include the data on "whether the printer is jammed or not" and the "power-saving mode".

The output initiation instruction module 33a confirms whether the switch 36 is pushed or not. When the switch 36 is pushed, the output initiation instruction module 33a judges that an output initiation instruction is given. Then, the output initiation instruction module 33a outputs through the parallel communication I/O interface 37 a trigger that represents status information printing initiation. After the trigger is outputted by the output initiation instruction module 33a, the status information output module 33c communicates with the host computer 10 through the parallel communication I/O interface 37 and transmits, in the binary form in the predetermined communication mode, the data written on the status information memory 34a. The status information acquisition module 33b on the printer's side once writes the data on the status information memory 34a. Alternatively, because it is desired that the capacity of the RAM be minimized to provide a low cost model printer, the acquired data might be sequentially transmitted from the parallel communication I/O interface.

If the status information data is transmitted in this way, the printer 30 can print the status information as the normal printing job because the status information data is returned as a printing data file from the host computer 10 through the parallel communication I/O interface 37, as stated later on. In other words, the printing data file 50 is transmitted from the host computer 10 and received by the printer 30 under the control of the printing module 33d through the parallel communication I/O interface 37.

The printing module 33d writes the acquired printing data file 50 in the buffer memory 34b, controls the printer controller 35 to drive the printing drive mechanisms of the printer 30, and then prints the data written in the buffer memory 34b. In this embodiment, the printing data is received as a printing file. However, band printing might be performed, in which the 1-page-long printing data is divided into several parts, to decrease the capacity of the buffer memory 34b.

In the host computer 10, as shown in the FIG. 2, the printer driver 21 is incorporated into the operating system 20. The printer driver 21 holds two-way communication with the printer 30 through the parallel communication I/O interface 19b and makes the printer 30 print the status information. This process is implemented while the output initiation instruction monitor module 21a, the status information acquisition module 21b on the host side, the printing data generation module 21c and the printing data output module 21d of the printer driver 21 are inputting status information data into and outputting status information data from the registry 22 and referring to the status sheet default file 51.

In other words, the output initiation instruction monitor module 21a monitors through the parallel communication I/O interface 19b whether the trigger outputted by the implementation of the output initiation instruction module 33a is received or not. When the module confirms the received trigger, the status information acquisition module 21b on the host side starts and receives, in the predetermined communication mode through the parallel communication I/O interface 19b, the binary status information data outputted by the status information output module 33c of the printer 30. This received data is written in the registry 22 by the status information acquisition module 21b on the host side. In the meantime, the status information acquisition module 21b on the host side is holding two-way communication in the predetermined communication mode with the printer 30. This communication mode is written in the registry 22 as the status information on the printer 30. To be precise, the codes indicating "ECP", "Nibble", etc are written as the communication modes in the registry 22.

Using the status information written in the registry 22, the printing data generation module 21c creates the images showing the status, and then generates the printing data file 50. The status information data acquired by the status information acquisition module 21b on the host side is binary, and therefore need to be images corresponding to the meaning of the status information data based on the character code. For this reason, the hard disk drive 15 on the host computer 10 contains the status sheet default file 51 as the form data for the printing images.

Figure 4:
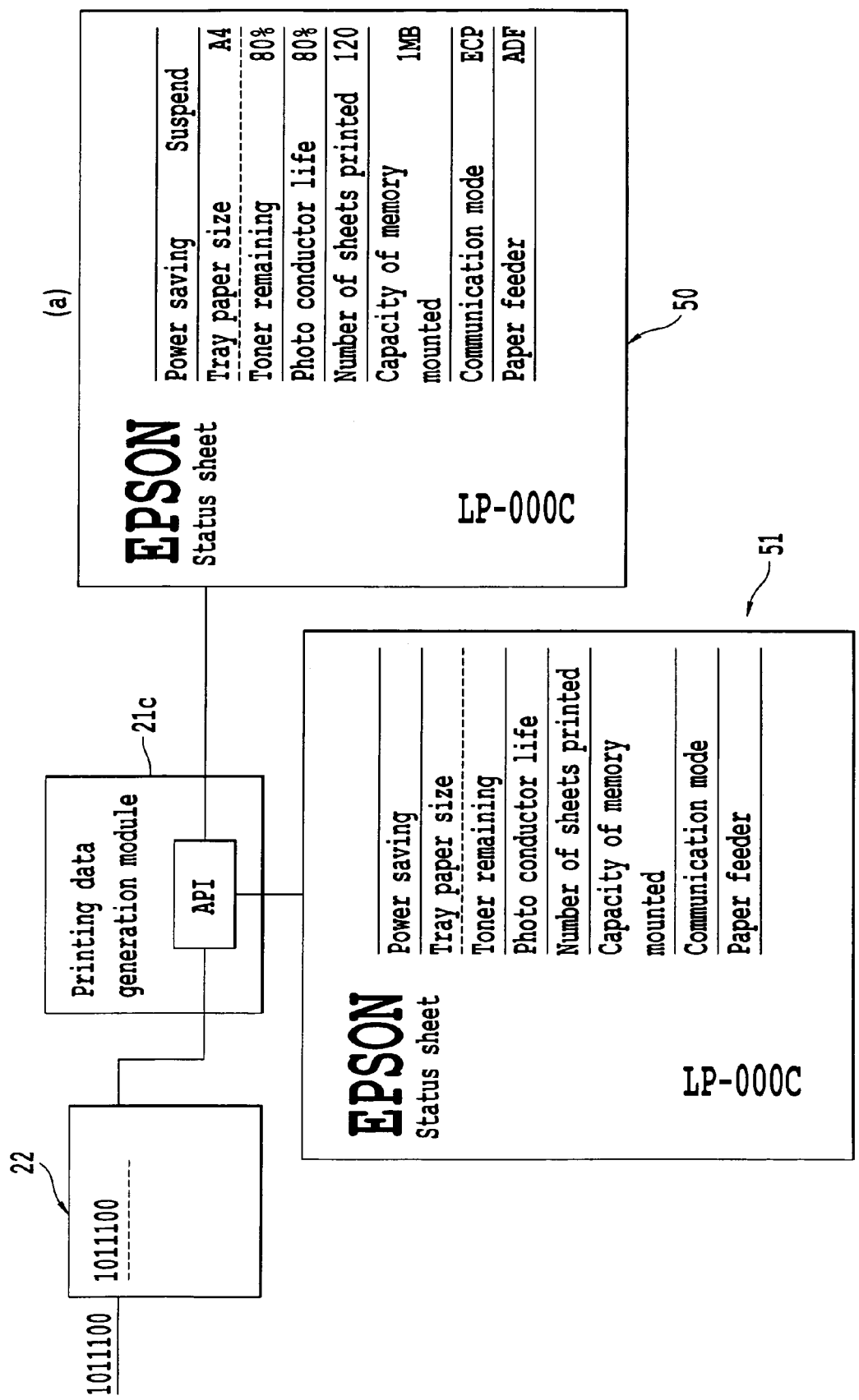
FIG. 4 shows the flow of the printing data file generation processing and the outline of the printing images.

FIG. 4 shows the flow of the printing data file generation processing and the outline of the printing images. Using an AP (application program interface), the printing data generation module 21c generates the printing job instance, then reproduces, on the basis of the status sheet default file 51, the form of the printing images as shown in FIG. 4 for the printing job instance. Then, the printing data generation module 21c generates the character string corresponding to the status shown by the status information data on the basis of the status information that is written in the registry 22. Using the text output API, the module also superposes the character string images on the predetermined location of the printing image form that is already reproduced in the printing job instance. As a result, the printing images, as shown in FIG. 4(a), are generated, and then the dot image data is spooled as the printing data file 50.

The generated printing data file 50 is outputted from the parallel communication I/O interface 19b by the printing data output module 21d in the same way as the normal printing job. As a result, the printing data file 50 is received under the control of the printing module 33d, and then the status information is outputted on the printer 30.

Figure 5:
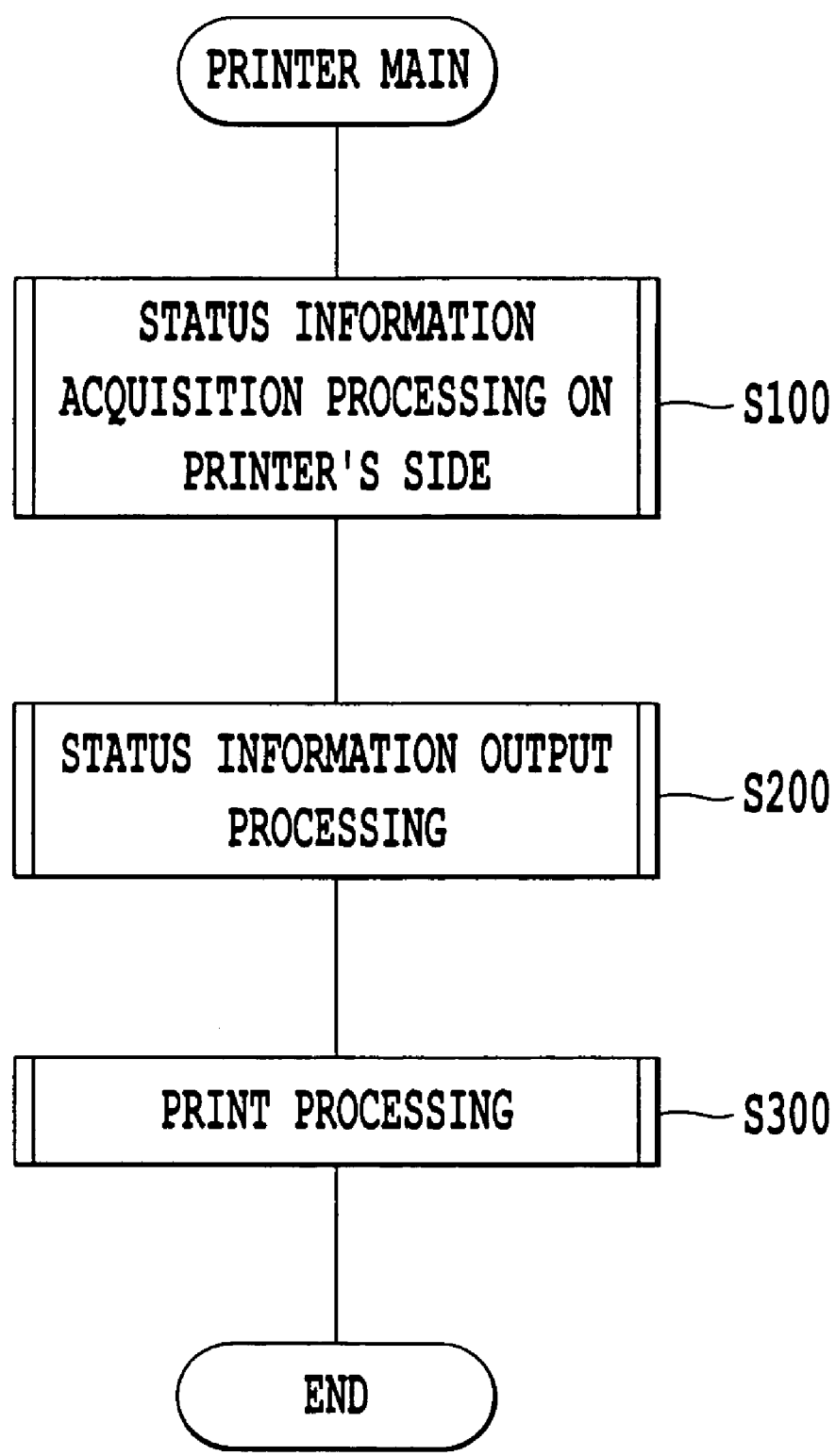
FIG. 5 is a flowchart of the main processing of the status information printing of the printer.

The following is the processing flow implemented by each module of the firmware of the printer driver 21 and the printer 30. FIG. 5 shows the main processing flow of the status information printing while the printer 30 is being driven. The step S100, which is the status information acquisition processing on the printer's side, performs the status information acquisition processing at the step S100 when the printer 30 is booted and the status is updated. The printer 30, usually in a standby state when printing is not performed, begins the appropriate processing when the status information output initiation instruction is performed or the printing job is inputted from the host computer 10. In other words, the status information output processing at the step 200 confirms whether the switch 36 is pushed, and the print processing at the step 300 confirms whether the printing job is inputted from the host computer 10.

Figure 6:
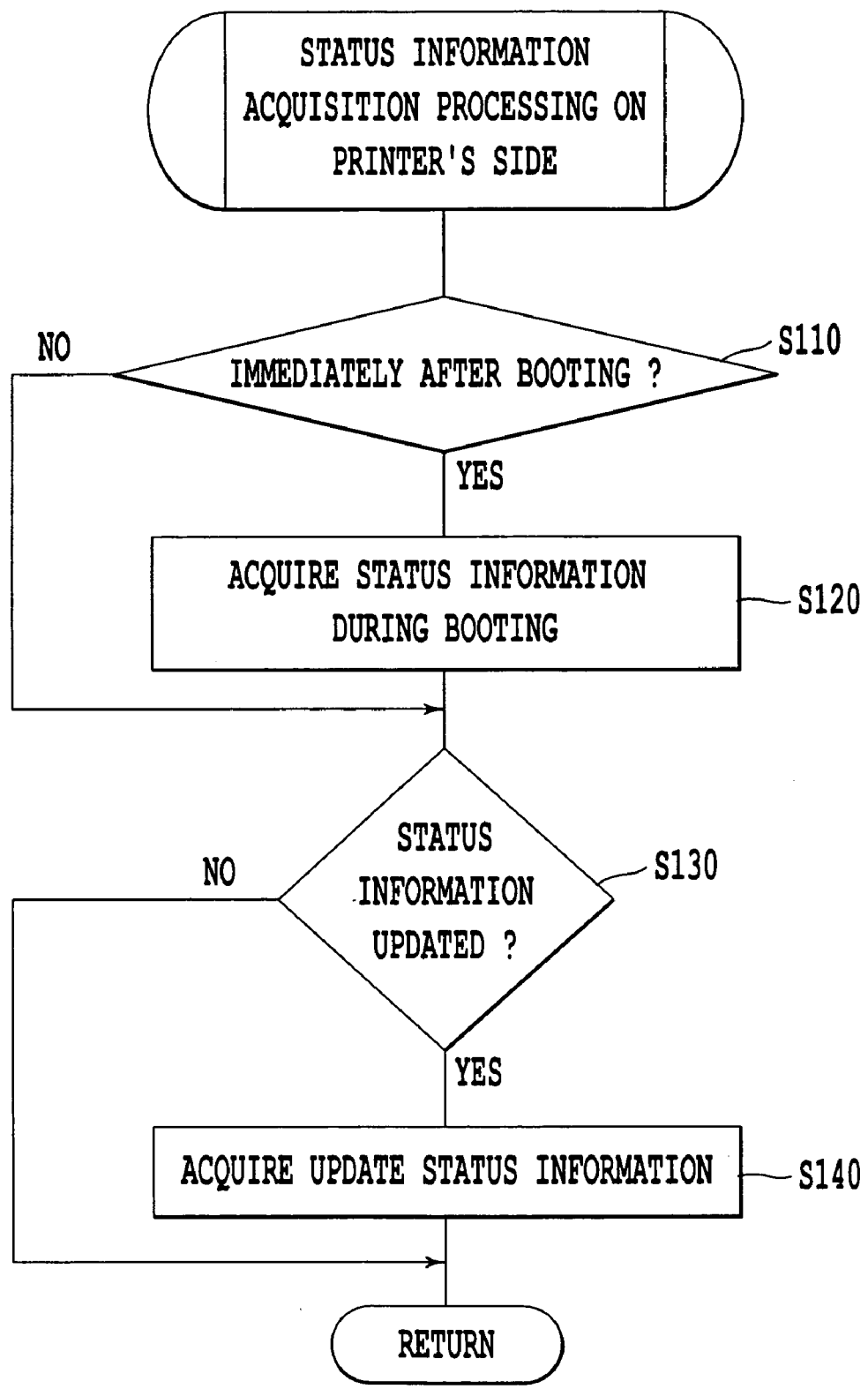
FIG. 6 is a flowchart of the status information acquisition processing on the printer's side.

FIG. 6 shows the processing flow of the status information acquisition on the printer's side at the step 100. The step 110 confirms whether the printer 30 is in the state that is immediately after the booting. In other word, in this embodiment there is the status information acquired only after the booting. When the step S110 confirms the printer 30 in the state which is immediately after the booting, the step 120 gives access to the printer controller 35 and the memory 34 through the system bus 32, acquires the status information data including the "optional paper feeder in use" and the "mounted memory size", and then stores them in the status information memory 34a.

The step 130 confirms whether the status information is updated. When the step 130 confirms that the status information is updated, the step 140 gives access to the printer controller 35 through the system bus 32, and acquires the status information data including the "toner remaining", the "life of consumable supplies for the photo conductor, etc", the "total number of the printed sheets", the "type of paper mounted", and "whether printing execution to be possible" whenever the system is updated. And then it stores them in the status information memory 34a. In addition, at the step S130, if the status information is not updated, the status information acquisition on the printer's side finishes without performing the step S140. When the printer 30 is booted, all the information mentioned above is acquired as the updated status information.

Figure 7:
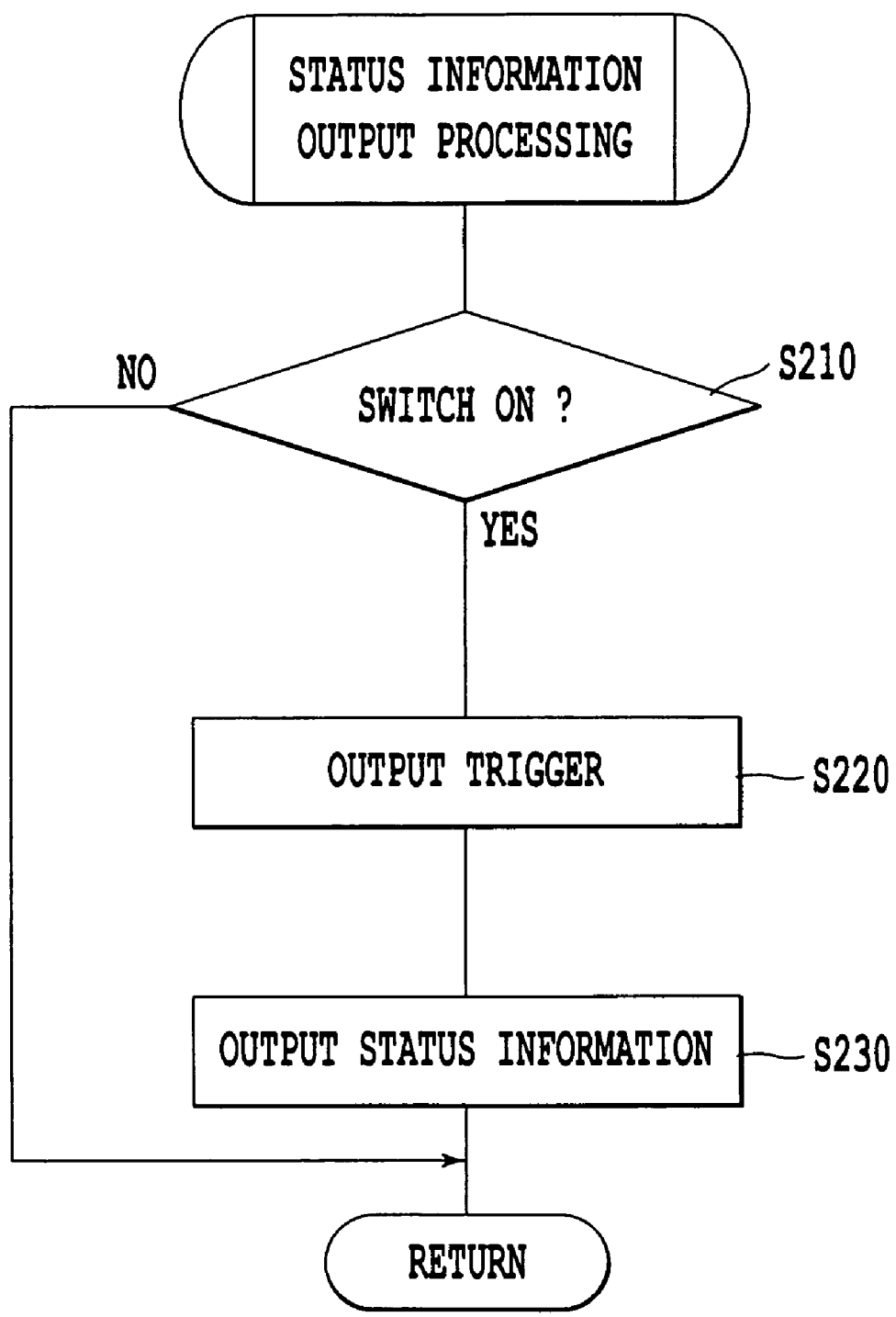
FIG. 7 is a flowchart of the status information output processing of the printer.

FIG. 7 shows the processing flow of the status information output at the step S200. The output initiation instruction module 33a at the step 210 confirms whether the switch 36 is pushed. The step 210 confirms that the switch 36 is pushed, the output initiation instruction module 33a outputs the trigger through the parallel communication I/O interface 37 at the step 220. Afterwards, the status information output module 33c outputs the status information data written in the status information memory 34a into the host computer 10 through the parallel communication I/O interface 37 at the step S230. The printer 30, after outputting the status information data, stays in a standby state, only waiting for the printing job of the printing data based on the status information data.

Figure 8:
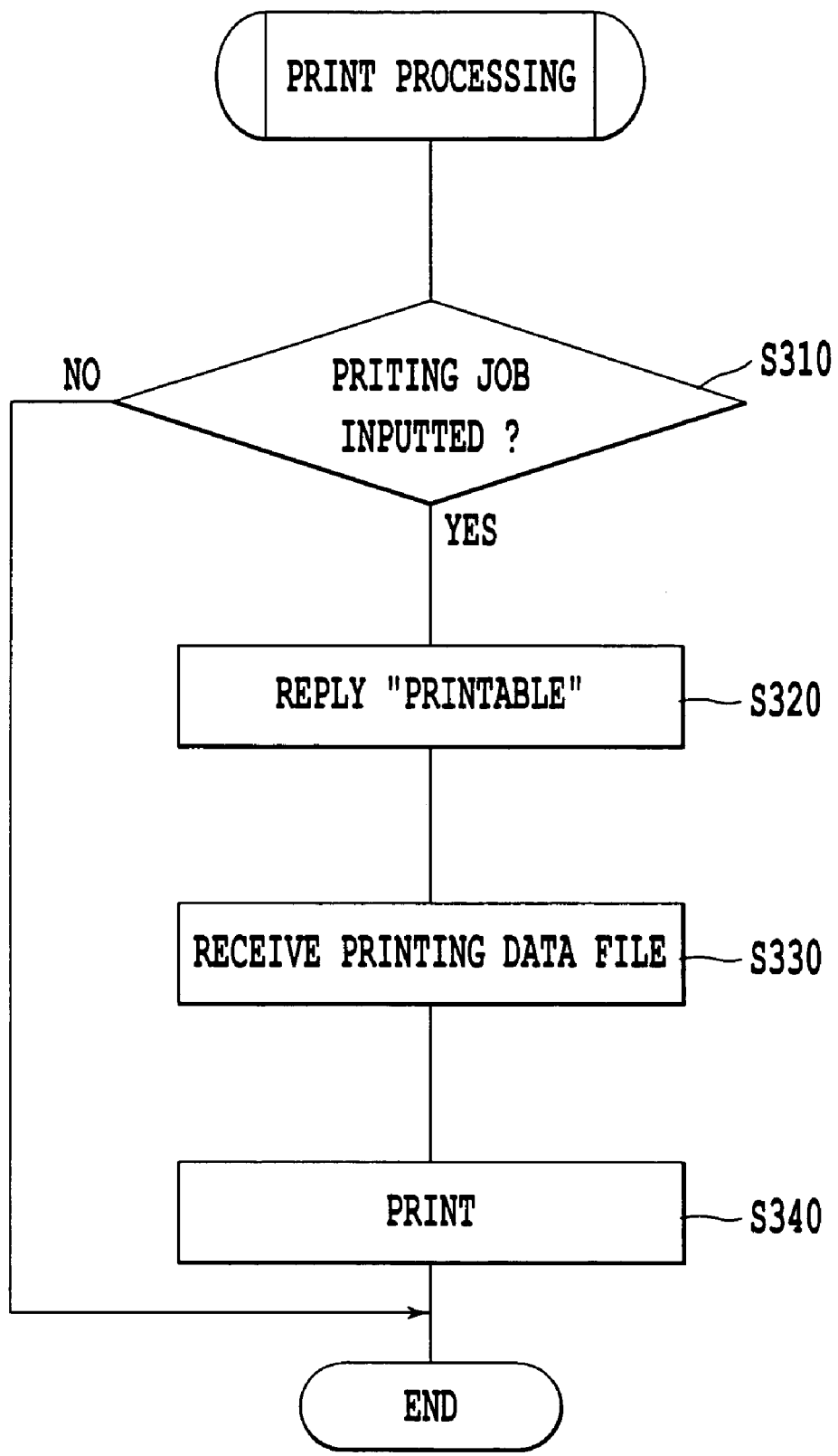
FIG. 8 is a flowchart of the print processing.

FIG. 8 shows the print processing flow at the step 300. The printing module 33d confirms whether the printing job is inputted from the host computer 10 through the parallel communication I/O interface 37 at the step S310. If the step 310 confirms that the printing job is inputted, the step 320 transmits the signal that printing can be performed to the printer 30 through the parallel communication I/O interface 37.

When an error does not occur by the processing on the host computer 10 described later, the printing data file is transmitted from the host computer 10. The printing module 33d receives the printing data file through the parallel communication I/O interface 37 at the step S330 and writes the printing data in the buffer memory 34b. Then the step S340 controls the printing controller 35 to drive printing composition for printing the status information.

Figure 9:
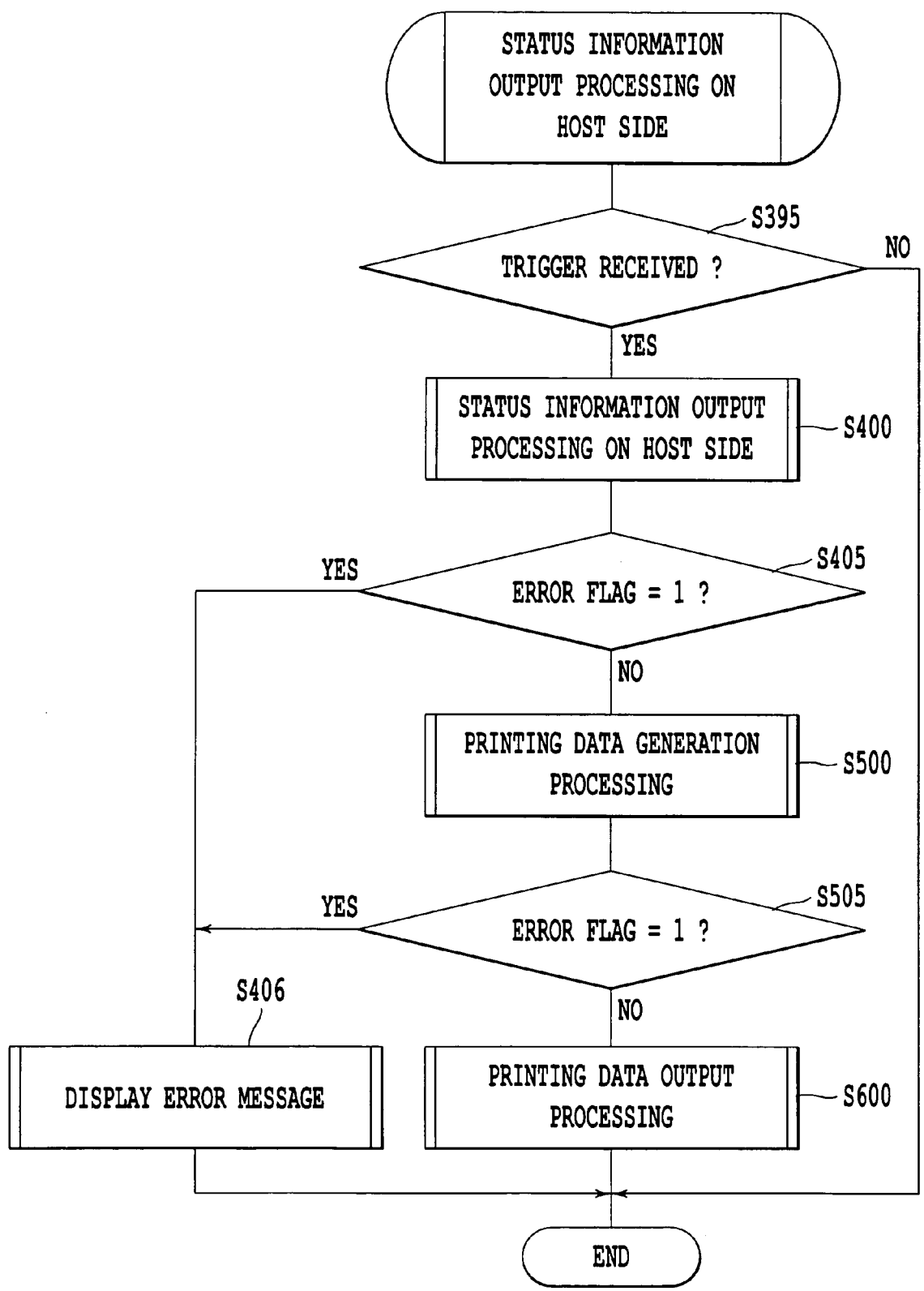
FIG. 9 is a flowchart of the main processing performed by the printer driver when status information is printed.

On the other hand, FIG. 9 shows the main processing flow in which the printer driver 21 performs the status information printing. In the figure, at the step S395 the output initiation instruction monitoring module 21a monitors the parallel communication I/O interface 19b and confirms whether the trigger is received from the output initiation instruction module 33 at the printer 30. When the step S395 confirms the trigger, at the step S400 the status information acquisition processing on the host side acquires the status information data outputted by the status information output module 33c at the printer 30.

The step S405 confirms by the error flag whether any error takes place at the status information acquisition processing on the host side at the step S405. If the step S405 confirms the error flag which shows "1", the step S406 shows the error message and finishes processing. If the step S405 doesn't confirm the error flag that shows "1", the printing data generation processing at the step 500 generates the printing data based on the dot image data. Afterwards, in the same way as the step S405, the step S505 confirms by the error flag whether any error, which indicates that the status from the printer 30 shows an unprintable one at the step S500, takes place. If the step S505 confirms the error flag which shows "1", the step S406 shows the error message and finishes processing. If the step S505 doesn't confirm the error flag which shows "1", the printing data output processing at the step 600 outputs the printing job and the printing data file.

Figure 10:
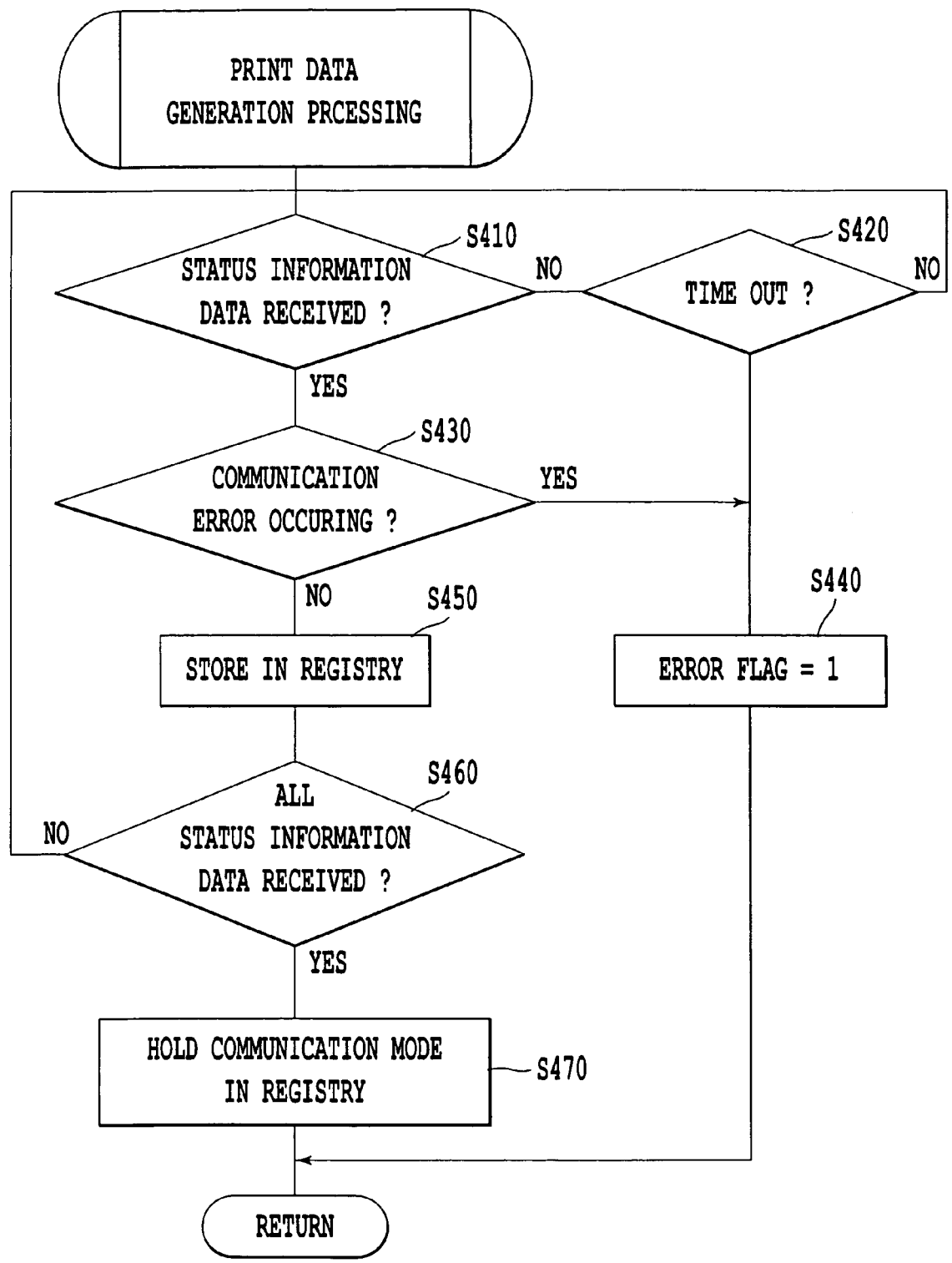
FIG. 10 is a flowchart of the status information acquisition processing on the host side of the printer driver.

FIG. 10 shows the status information acquisition processing on the host side at the step 400. The status information acquisition module 21b on the host side confirms through the parallel communication I/O19b whether, at the step S410, the status information output module 33c on the printer 30 receives the status information data outputted through the parallel communication I/O37, and also confirms whether the communication error takes place at the S430. In case the step S410 confirms the status information data received and then the step S430 confirms no communication error, the step S450 writes the status information data in the registry 22.

The step S460 confirms whether all the status information data is received. Above-mentioned processing is repeated until the step S460 confirms all the status information data is received. Even when the step S410 doesn't confirm that the status information data is received, it continues waiting for the status information data to be received for the predetermined period set at the step S420. When the step S420 confirms the time-out, and the step S430 confirms the communication error, the step S440 stands the error flag "1." In other words, when the communication error and the time-out take place because of some factors, the status information data cannot be obtained correctly. Therefore, the step S406 stands the error flag to inform the user of the incident.

The predetermined communication mode between each module in the printer driver 21 and the printer 30 is needed to perform the two-way communication through the parallel communication I/O interface 19b and the parallel communication I/O interface 37. Here, the current communication mode, selected from the several possible modes, is included in the status information. At the step S470 the two-way communication mode performed at the S410, etc is stored in the registry 22 in binary. As a result, the status information images including the communication mode are generated in the printing data generation processing described later. In the conventional method, it is impossible to obtain the correct communication mode because the printer self-completely prints the status information without the communication with the host computer. In this embodiment, the actual communication mode is confirmed, consequently the correct communication mode can be printed as the status information.

Figure 11:
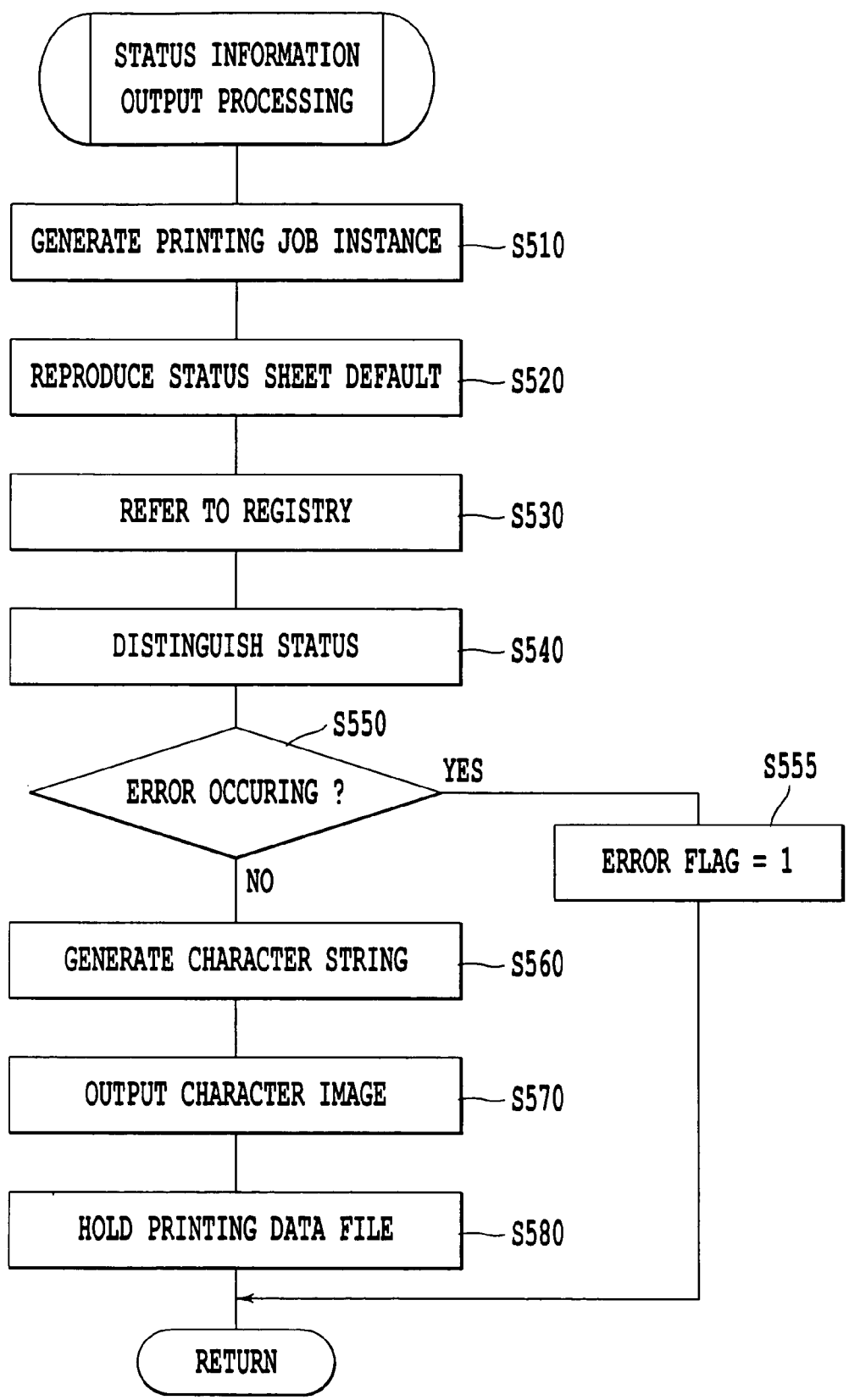
FIG. 11 is a flowchart of the printing data generation processing of the printer driver.

FIG. 11 shows the printing data generation processing at the step S500. Using the API, the printing data generation module 21c generates the printing job instance at the step S510. The step S520 reproduces the form of the printing images that are based on the status sheet default file 51 on the printing job instance generated at the step S510. Then the step S530 refers to the status information data written in the registry 22 and the step S540 distinguishes the contents of the status information data written in it. Here, because the status information data contains the information "Unprintable or not", the step S550 confirms whether the status information data is "impossible printing implementation (error)" based on the content distinction at the step S540.

If the step S550 confirms the error, the step S555 makes the error flag "1" to display the error message at the step S406 described later. If the step S550 doesn't confirm the error, the step S560 generates the character strings based on the content distinction of the status information data. At the step S570 the generated character strings by use of the text output API is outputted into the printing job instance generated at the step S510. As a result, the status images superposed by the status information are generated. The printing data file based on the images is created at the step S580, being written in the RAM 14 or the hard disk drive 15.

Figure 12:
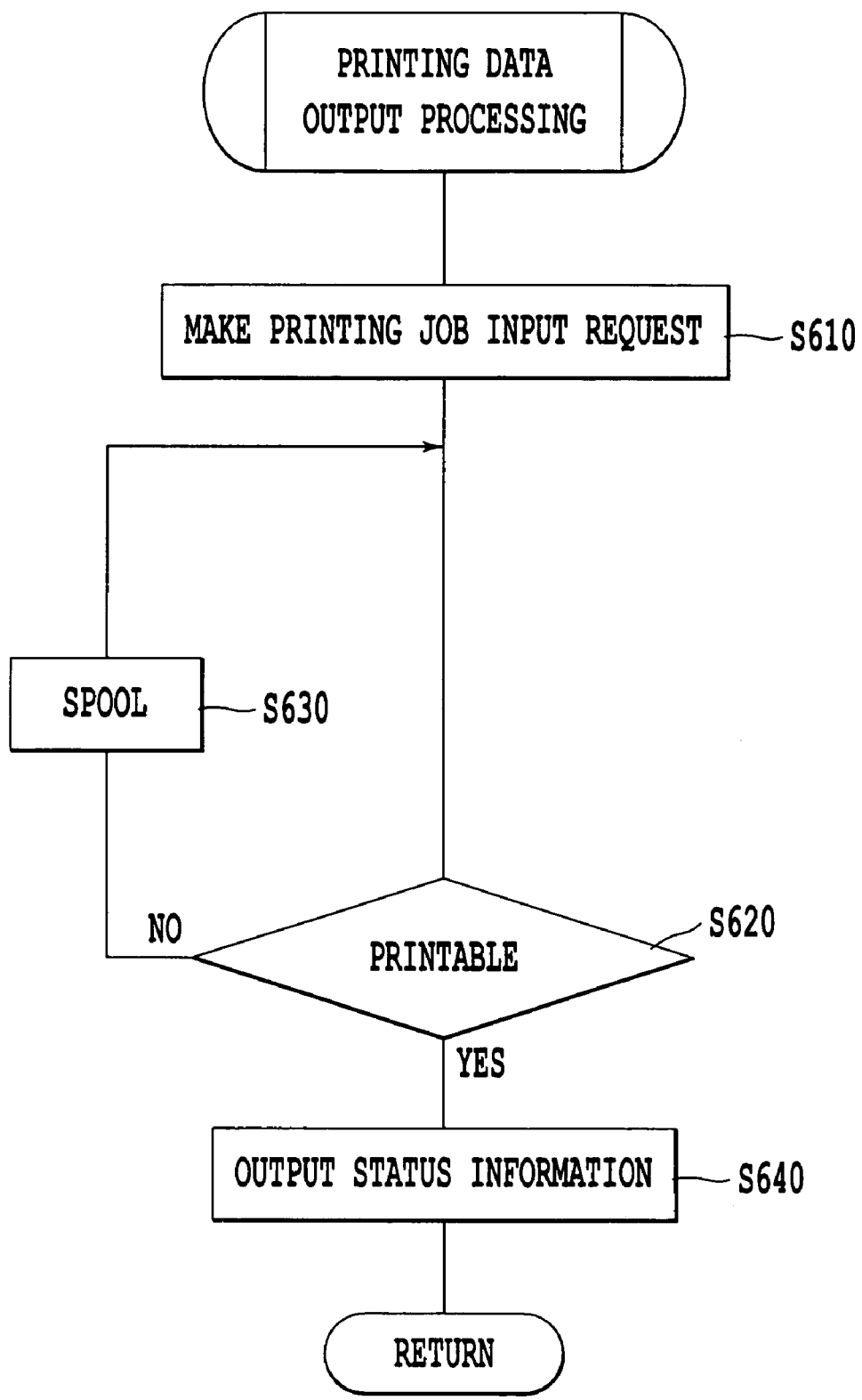
FIG. 12 is a flowchart of the printing data output processing of the printer driver.

FIG. 12 shows the printing data output processing at the step S600. The printing data output module 21d makes a printing job input request to the host computer 10 through the parallel communication I/O interface 19b at the step S610. The step S620 confirms whether the printing module 33d on the printer 30 returns the printable signal. The step S630 spools the printing file for the printing job until printing is made possible. When the step S620 receives the printable signal from the printer 30 through the parallel communication I/O interface 19b, the step S640 outputs the printing file written in the RAM 14 or in the hard disk drive 15 to the printer 30 through the parallel communication I/O interface 19*b*.

In this way, the printing data file outputted to the printer 30 is printed in the print processing shown in FIG. 8, then the status information is offered to the user as an end product shown in the FIG. 4(*a*). In this embodiment, the status information data starts with the pushing operation of the switch 36, consequently it gets better for the user to obtain the status information whenever the user makes the status information printing request. However, this composition is not necessary at all times. The output initiation instruction of the status information can be stored in the status information memory as part of the status information data. If the host computer is made possible to monitor the stored information in this composition, the host computer can grasp the output initiation instruction, enabling the status information to be printed.

Thus, in this invention, the user enables the printing initiation instruction on the status information to be implemented by the switch 36 on the printer 30 (the printing initiation instruction module 33*a* and the output initiation instruction monitoring module 21*a*). With the printing initiation instruction, the printer 30 and the host computer 20 perform the two-way communication through the parallel communication I/O interfaces 27 and 19*b*. Through the communication, the status information output module 33C once transmits the status information obtained in the status information acquisition module 33*b* on the printer 30 to the host computer 20. When the status information acquisition module 21*b* on the printer obtains the status information on the host computer 20, the printing data output module 21*c* generates the printing file 50, and then the printing data output module 21*d* implements the printing job for the printing file 50. Therefore, it is not necessary to equip the processor and the font ROM with the printer 30 to generate the printing data. The status information can be printed on the simple and low-cost printer 30.

As explained hereinbefore, the status information data on the printer is transmitted to the host computer, on which the printing data is generated based on the status information data. The status information is printed based on the printing data. Therefore, it is not necessary to generate the printing data with the processor on the printer, which enables the printer composition to be simplified.

In accordance with the invention, by generating the printing data based on the dot image data, the font ROM becomes unnecessary on the printer, the processing based on the page description language in the processor becomes unnecessary, and the printer composition becomes simple. These make an answer to the printer of a low cost model.

In accordance with the invention, the initiation instruction of the status information output can be easily given.

In accordance with the invention, the initiation instruction of the status information output can be easily given.

In accordance with the invention, the user can confirm whether the status information is to be printed in the unprintable state.

In accordance with the invention, the status sheet can accurately show the communication mode at all times.

In accordance with the invention, the processing burden can be mitigated by minimizing the individual image generation processing. Especially the processing of creating the form from the default file can be simplified since it takes advantage of the operating system function.

In accordance with the invention, with the processor it is not to generate the printing data, neither is it necessary to perform the processing based on the Page Description Language. The font ROM becomes unnecessary. As a result, the printer composition can be more simplified.

Especially, in accordance with the invention, the printer of low processing capability can be available because the composition minimizes the amount of the information to be updated, making a processing burden mitigated.

In accordance with the invention, a printing controller, which enables a simple and low-cost printer to print the status information, can be offered.

In accordance with the invention, a status information printing method, which enables a simple and low-cost printer to print the status information, can be offered.

In accordance with the invention, a status information printing system, which enables a simple and low-cost printer to print the status information, can be offered.

The invention claimed is:

1. A computer readable medium having a status information printing program recorded thereon to be run on a host computer in order for a printer to print status information, the host computer and the printer being connected for two-way communication, the printing program comprising:
   an output initiation instruction monitor function configured to monitor the output initiation instruction for the status information that the printer outputs through the two-way communication, the status information being output without solicitation from the host computer;
   a status information acquisition function on the host side configured to acquire status information data from the printer through the two-way communication;
   a printing data generation function configured to generate printing data to print printer status information indicated by the status information data acquired by the status information acquisition function on the host side when the output initiation instruction is recognized by the output initiation instruction monitor function; and
   a printing data output function configured to output to the printer through the two-way communication the printing data generated by the printing data generation function.

2. The computer readable medium according to claim 1, wherein
   the printing data generated by the printing data generation function is dot image data.

3. The computer readable medium according to claim 1, wherein
   part of the status information data is in the printer whether the output initiation instruction exists or not; and
   the output initiation instruction monitor function is configured to monitor whether the output initiation instruction is contained in the status information data acquired by the status information acquisition function on the host side.

4. The computer readable medium according to claim 1, wherein
   the output initiation instruction is a trigger transmitted from the printer through the two-way communication; and
   the output initiation instruction monitor function is configured to judge whether the trigger is received.

5. The computer readable medium according to claim 1, wherein
   the status information acquisition function is configured to analyze the status of the printer based on the acquired status information data; and the status information acquisition function is configured to warn a user on the host computer if the printer can perform no printing.

6. The computer readable medium according to claim 1, wherein
the status information acquisition function is configured to acquire the communication mode as the status information data when two-way communication is held with the printer.

7. The computer readable medium according to claim 1, wherein
the printing data generation function is configured to generate from a default file the form of the printing images to be printed by the printer, generate the character string image corresponding to the status based on the status information data, and generate the printing image by superposing them together.

8. A printer for holding two-way communication with a host computer and printing status information about the printer, the printer comprising:
an output initiation instruction unit configured to instruct the output initiation of the status information;
a status information acquisition unit on the printer's side configured to acquire status information data on the printer;
a status information output unit configured to output through the two-way communication, without solicitation from the host computer, the status information data acquired by the status information acquisition unit on the printer's side, and causing the host computer to generate printing data for the printer to print the status information; and
a printing unit configured to receive the printing data from the host computer through the two-way communication and performing predetermined printing based on the received data.

9. The printer according to claim 8, wherein
the printing data received by the printing unit is dot image data.

10. The printer according to claim 8, wherein
the status information acquisition unit includes a status information data storage part for storing status information data, and is configured to write the output initiation instruction as part of the status information data in accordance with the output initiation instruction of the output initiation instruction unit; and
the status information output unit is configured to output through the two-way communication the status information data stored in the status information data storage part.

11. The printer according to claim 8, wherein
the output initiation instruction unit is configured to output a trigger as the output initiation instruction through the two-way communication; and
the status information output unit is configured to output the status information data acquired by the status information acquisition unit after the trigger is outputted.

12. The printer according to claim 8, wherein
the output initiation instruction unit includes a predetermined instruction button, multiple operation of which gives the output initiation instruction.

13. The printer according to claim 8, wherein
the status information acquisition unit is configured to acquire fixed status information only when the printer is booted; and the status information acquisition unit is configured to acquire sequentially updated status information when the status is updated.

14. A printing controller for causing a printer connected for two-way communication to print status information on the printer, the printing controller comprising:
an output initiation instruction monitor unit configured to monitor the output initiation instruction for the status information that the printer outputs through the two-way communication, the status information being output without solicitation from the host computer;
a status information acquisition unit on the host side configured to acquire status information data from the printer through the two-way communication;
a printing data generation unit configured to generate printing data to print printer status information indicated by the status information data acquired by the status information acquisition unit on the host side when the output initiation instruction monitor unit recognizes the output initiation instruction; and
a printing data output unit configured to output to the printer through the two-way communication the printing data generated by the printing data generation unit.

15. The printing controller according to claim 14, wherein
the printing data generated by the printing data generation unit is dot image data.

16. The printing controller according to claim 14, wherein
part of the status information data is in the printer whether the output initiation instruction exists or not; and
the output initiation instruction monitor unit is configured to monitor whether the output initiation instruction is contained in the status information data acquired by the status information acquisition unit on the host side.

17. The printing controller according to claim 14, wherein
the output initiation instruction is a trigger transmitted from the printer through the two-way communication; and
the output initiation instruction monitor unit is configured to judge whether the trigger is received.

18. The printing controller according to claim 14, wherein
the status information acquisition unit is configured to analyze the status of the printer based on the acquired status information data; and
the status information acquisition unit is configured to warn a user if the printer can perform no printing.

19. The printing controller according to claim 18, wherein
the status information acquisition unit is configured to acquire the communication mode as the status information data when two-way communication is held with the printer.

20. The printing controller according to claim 14, wherein
the printing data generation unit is configured to generate from a default file the form of the printing images to be printed by the printer, generate the character string image corresponding to the status based on the status information data, and generate the printing image by superposing them together.

21. A status information printing method for causing a printer to print status information under the control of a host computer, the printer and the host computer being connected for two-way communication, the method comprising:
an output initiation instruction monitor step for monitoring the output initiation instruction for the status information that the printer outputs through the two-way communication, the status information being output without solicitation from the host computer;

a status information acquisition step on the host side for acquiring status information data from the printer through the two-way communication;

a printing data generation step for generating printing data to print printer status information indicated by the status information data acquired in the status information acquisition step on the host side when the output initiation instruction is recognized in the output initiation instruction monitor step; and a printing data output step for outputting to the printer through the two-way communication the printing data generated in the printing data generation step.

22. The status information printing method according to claim 21, wherein the printing data generated in the printing data generation step is dot image data.

23. The status information printing method according to claim 21, wherein part of the status information data is in the printer whether the output initiation instruction exists or not; and the output initiation instruction monitor step monitors whether the output initiation instruction is contained in the status information data acquired in the status information acquisition step on the host side.

24. The status information printing method according to claim 21, wherein the output initiation instruction is a trigger transmitted from the printer through the two-way communication; and the output initiation instruction monitor step judges whether the trigger is received.

25. The status information printing method according to claim 21, wherein the status information acquisition step analyzes the status of the printer based on the acquired status information data; and the status information acquisition step warns a user if the printer can perform no printing.

26. The status information printing method according to claim 21, wherein the status information acquisition step acquires the communication mode as the status information data when two-way communication is held with the printer.

27. The status information printing method according to claim 21, wherein the printing data generation step generates from a default file the form of the printing images to be printed by the printer, then generates the character string image corresponding to the status based on the status information data, and generates the printing image by superposing them together.

28. A status information printing system consisting of a host computer and a printer that are connected for two-way communication via a predetermined data transfer line, the system, comprising:

the printer configured to output status information data through the two-way communication to the host computer, without solicitation from the host computer, in accordance with a status information output initiation instruction, and perform predetermined printing based on printing data outputted by the host computer; and the host computer configured to acquire the status information data outputted from the printer through the two-way communication and generate predetermined printing data to print printer status information indicated by the status information data, and output the printing data to the printer.

* * * * *